United States Patent
Giardina et al.

(10) Patent No.: US 11,668,649 B2
(45) Date of Patent: *Jun. 6, 2023

(54) DEVICE FOR THE TEMPERATURE-COMPENSATED OPTICAL DETECTION OF AN OXYGEN CONTENT OF A FLUID

(71) Applicant: Hamilton Bonaduz AG, Bonaduz (CH)

(72) Inventors: Marco Giardina, Neuchatel (CH); Bernd Offenbeck, Regensburg (DE); Christoph Schranz, Bonaduz (CH); Thomas Laubscher, Rhäzuns (CH); Dominik Novotni, Chur (CH); Dirk Schönfuss, Tamins (CH)

(73) Assignee: HAMILTON BONADUZ AG, Bondaduz (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/370,058

(22) Filed: Jul. 8, 2021

(65) Prior Publication Data
US 2022/0268695 A1    Aug. 25, 2022

Related U.S. Application Data

(62) Division of application No. 16/493,381, filed as application No. PCT/EP2018/055497 on Mar. 6, 2018, now Pat. No. 11,119,036.

(30) Foreign Application Priority Data

Mar. 13, 2017 (DE) .......................... 102017204082.3

(51) Int. Cl.
*G01N 21/3504* (2014.01)
*G01J 5/00* (2022.01)
(Continued)

(52) U.S. Cl.
CPC ........ *G01N 21/3504* (2013.01); *G01J 5/0014* (2013.01); *G01J 5/0802* (2022.01); *G01N 21/77* (2013.01)

(58) Field of Classification Search
CPC ... G01N 21/3504; G01N 21/77; G01J 5/0014; G01J 5/0802
See application file for complete search history.

(56) References Cited

U.S. PATENT DOCUMENTS

| | | |
|---|---|---|
| 5,107,445 A | 4/1992 | Jensen et al. |
| 5,351,268 A | 9/1994 | Jensen et al. |
| (Continued) | | |

FOREIGN PATENT DOCUMENTS

| | | |
|---|---|---|
| DE | 3346810 | 3/1995 |
| DE | 69128644 | 5/1998 |
| (Continued) | | |

OTHER PUBLICATIONS

German Search Report issued in German Application No. DE 10 2017 204 082.3.
(Continued)

*Primary Examiner* — Jamil Ahmed
(74) *Attorney, Agent, or Firm* — Tollefson IP

(57) ABSTRACT

A sensor arrangement includes a reaction subassembly having a housing and a detector subassembly. The housing is a layered component arrangement encompassing a luminophore-containing reaction laminate excitable, by irradiation with a first electromagnetic radiation of a first wavelength, to emit a second electromagnetic radiation of a second wavelength different from the first wavelength; and a temperature-detection laminate emitting an infrared radiation. The housing includes an opening for introducing a fluid, a reaction window and a temperature-sensing window. The reaction window transmits the first and second electromag- (Continued)

netic radiation, and the temperature-sensing window is penetrable by infrared radiation. The detector subassembly encompasses a radiation source emitting the first electromagnetic radiation, a radiation detector detecting the second electromagnetic radiation, and an infrared detector detecting, through the temperature detection window, the infrared radiation emitted from the temperature detection laminate. The reaction laminate and the temperature-detection laminate are embodied separately.

12 Claims, 5 Drawing Sheets

(51) Int. Cl.
  G01J 5/0802 (2022.01)
  G01N 21/77 (2006.01)

(56) References Cited

U.S. PATENT DOCUMENTS

| | | | |
|---|---|---|---|
| 5,793,044 | A | 8/1998 | Mace et al. |
| 6,303,386 | B2 | 10/2001 | Klimant et al. |
| 6,325,978 | B1 | 12/2001 | Labuda et al. |
| 6,653,148 | B2 | 11/2003 | Trapp et al. |
| 6,815,211 | B1 | 11/2004 | Blazewicz et al. |
| 6,888,101 | B2 | 5/2005 | Davis |
| 8,312,878 | B2 | 11/2012 | Orr et al. |
| 8,629,401 | B2 | 1/2014 | Kaskel et al. |
| 8,696,591 | B2 | 4/2014 | Orr et al. |
| 2001/0001642 | A1 | 5/2001 | Klimant et al. |
| 2002/0098120 | A1 | 7/2002 | Blazewicz et al. |
| 2002/0164813 | A1 | 11/2002 | Colvin, Jr. et al. |
| 2003/0006223 | A1 | 1/2003 | Davis |
| 2003/0017078 | A1 | 1/2003 | Trapp et al. |
| 2007/0212792 | A1 | 9/2007 | Havens et al. |
| 2008/0121232 | A1 | 5/2008 | Cewers |
| 2008/0127977 | A1 | 6/2008 | Orr et al. |
| 2011/0104546 | A1 | 5/2011 | Seino et al. |
| 2011/0105910 | A1 | 5/2011 | Lawson et al. |
| 2012/0012756 | A1 | 1/2012 | Beck et al. |
| 2012/0168628 | A1 | 7/2012 | Kaskel et al. |
| 2013/0023782 | A1* | 1/2013 | Karlsson ............. G01N 21/643 600/532 |
| 2013/0041280 | A1 | 2/2013 | Orr et al. |
| 2013/0300331 | A1 | 11/2013 | Nishii |
| 2015/0282749 | A1 | 10/2015 | Zand et al. |
| 2016/0293891 | A1 | 10/2016 | Son |
| 2017/0348047 | A1 | 12/2017 | Reiter et al. |

FOREIGN PATENT DOCUMENTS

| | | |
|---|---|---|
| DE | 19913783 | 3/2000 |
| DE | 10051220 | 4/2002 |
| DE | 60213231 | 6/2007 |
| DE | 102009031764 | 1/2011 |
| DE | 202011106578 | 10/2011 |
| DE | 102014103721 | 6/2015 |
| EP | 1319933 | 6/2003 |
| FR | 2538550 | 6/1984 |
| GB | 2132348 | 5/1987 |
| JP | 09099085 A | 4/1997 |
| JP | 2005195354 A | 7/2005 |
| JP | 200610517 A | 1/2006 |
| JP | 2012254222 A | 6/2011 |
| WO | 97/24606 | 7/1997 |
| WO | 2007/147276 | 12/2007 |
| WO | 2008/070629 | 6/2008 |
| WO | 2009154612 A1 | 12/2009 |

OTHER PUBLICATIONS

International Search Report issued in PCT/EP2018/055497.
Japanese Patent Office Search Report issued in JP 2019-550648.

* cited by examiner

DEVICE FOR THE TEMPERATURE-COMPENSATED OPTICAL DETECTION OF AN OXYGEN CONTENT OF A FLUID

CROSS-REFERENCE TO RELATED APPLICATIONS

This application is a divisional application of U.S. patent application Ser. No. 16/493,381, filed Sep. 12, 2019, which is the National Stage of International Application No. PCT/EP2018/055497, filed on Mar. 6, 2018, which claims the benefit of German Application No. 10 2017 204 082.3, filed on Mar. 13, 2017. The entire contents of each of which are hereby incorporated herein by reference.

BACKGROUND OF THE INVENTION

The present invention relates to a planar layered component arrangement for temperature-compensated optical detection of an oxygen content of a fluid, the planar layered component arrangement encompassing:
- a luminophore-containing reaction laminate whose luminophore is excitable, by irradiation with a first electromagnetic radiation of a first wavelength, to emit a second electromagnetic radiation of a second wavelength different from the first wavelength, the excited emission behavior of the luminophore being dependent on an oxygen partial pressure in a fluid contacting the luminophore; and
- a temperature-detection laminate emitting an infrared radiation.

A layered component arrangement of the species is known from US 2013/0023782 A1. This document describes a sensor arrangement having a layered component arrangement of this kind for measuring an oxygen concentration of a respiratory gas based on the measurement principle, known per se, of oxygen-induced luminescence quenching of luminophores. In this context, luminophores present in the reaction laminate are excited, by irradiation with the first electromagnetic radiation, to emit an electromagnetic radiation that is different from the first. As a rule, the second electromagnetic radiation has a longer wavelength than the first electromagnetic radiation.

The underlying measurement principle can be presented in simplified summary fashion as follows: An energy input into the luminophore takes place as a result of irradiation with the first electromagnetic radiation. The excitation energy imparted to the luminophore by irradiation is delivered back, with a certain time offset, in the form of the second electromagnetic radiation. If the luminophore excited by irradiation with the first electromagnetic radiation is in contact with oxygen, however, a radiation-free deexcitation of the luminophore takes place by energy transfer to the contacting oxygen. Oxygen present at the luminophore thereby influences the latter's emission behavior in response to the excitation produced by irradiation.

The oxygen that contacts the luminophore influences the latter's emission behavior when excitation is otherwise identical in terms of the intensity of the second electromagnetic radiation, and in terms of the emission duration of the second electromagnetic radiation. It is considered more accurate to evaluate the emission behavior of the luminophore, as a response to irradiation with the first electromagnetic radiation and influenced by the presence of oxygen, based on the time characteristic of the emission behavior, compared with evaluation based on the intensity that is influenced, since in contrast to an evaluation based on intensity, an evaluation based on the time characteristic of the emission of the second electromagnetic radiation is uninfluenced, or at least less influenced, by age-related bleaching of the luminophore.

The emission behavior of luminophores is furthermore influenced, under otherwise identical conditions, by the temperature of the luminophore. This complicates the evaluation of the (usually sensorially observed) emission behavior in a variable temperature environment. A variable-temperature environment exists, for example, when measuring the oxygen concentration in a respiratory gas, which as a rule is delivered to the patient at a different temperature than when he or she exhales it again after a certain degree of metabolization. The temperature of the exhaled respiratory gas can also change depending on the patient's state of health.

To solve this problem, US 2013/0023782 A1 proposes to measure the temperature of the luminophore-containing reaction laminate in noncontact fashion using an infrared detector. The intention is to detect the temperature of the luminophore simultaneously with detection of its emission behavior, so that the emission behavior can be correctly evaluated with a knowledge of the temperature.

In accordance with US 2013/0023782 A1, the luminophore-containing reaction laminate and the temperature-detection laminate are therefore one and the same body.

A planar layered component arrangement for a sensor arrangement for measuring an oxygen content of respiratory gas is furthermore known from U.S. Pat. No. 7,833,480 B2. The teaching of this document as well is to eliminate the system-inherent uncertainty in the evaluation of the detected emission behavior which results from the temperature dependence of the emission behavior of luminophores by using a heating device to bring the reaction laminate to a constant known temperature and maintain it there. The temperature of the luminophore thus does not change during detection, and the emission signal that is obtained can be evaluated.

The approach just recited is disadvantageous because of its considerable instrumental complexity, since it is necessary to provide on the layered component arrangement a heating device that must be supplied with energy. The additional heating device can furthermore distort the measurement result or can fail to eliminate the temperature dependence to the desired extent, since because of the measurement principle it is necessary for the excited luminophore to come into contact with oxygen. A certain degree of convective heat transfer between the reaction laminate and the measured-object fluid whose oxygen content is to be detected is thus unavoidable, so that even though a heating device is provided, the temperature of the luminophore during detection of its emission is not necessarily accurately known.

The approach proposed by the document US 2013/0023782 A1 of the species, for detecting the temperature of the reaction laminate and for data-based temperature compensation of the detected emission behavior, is likewise not without its disadvantages.

For one, with the approach according to the species two radiation sources and two radiation detectors are present in the same measurement space. The first radiation source is intended to excite the luminophore in the reaction laminate by emitting the first electromagnetic radiation. This excitation usually does not occur in the infrared wavelength region of electromagnetic radiation, but it is not to be ruled out that this first radiation source might also radiate, along with the desired first electromagnetic radiation, further wavelengths that extend into the infrared and thus might constitute an interference signal source.

The second radiation source is the luminophore of the reaction laminate, which emits both the second electromagnetic radiation in response to its excitation, and an infrared radiation corresponding to its temperature.

On the one hand, the wavelengths of the two radiations (second electromagnetic radiation and temperature-based infrared radiation) can be close to one another and can be difficult to distinguish, which in turn constitutes a source of mutual interference between the respective signals.

On the other hand, the known reaction laminate is wetted on one of its sides with the measured-object fluid whose oxygen content is to be detected, and on its opposite side is detected in terms of the radiation proceeding from it. The known reaction laminate must therefore be shielded with respect to both the first radiation source and the radiation detectors, in order to prevent oxygen-containing fluid from also traveling from the detection side to the luminophore of the reaction laminate and distorting the detection of the emission behavior.

The at least oxygen-tight shielding of the reaction laminate with respect to the first radiation source and the detector arrangement must allow both the second electromagnetic radiation and the temperature-based infrared radiation to pass with as little impairment as possible, so that the emission behavior of the reaction laminate can be detected with minimal distortion. This results in a considerable limitation in terms of the materials usable for shielding. For some wavelength regions of the second electromagnetic radiation and temperature-based infrared radiation it may in fact be impossible in some circumstances to find any material that transmits both types of electromagnetic radiation in sufficiently undistorted fashion.

SUMMARY OF THE INVENTION

The object of the present invention is therefore to refine a planar layered component arrangement of the species in such a way that the disadvantages recited above in connection with the known layered component arrangement of the species are mitigated or entirely eliminated. The intention is therefore to furnish a layered component arrangement that makes possible very accurate optical detection of an oxygen content of a fluid by temperature compensation of the detected emission behavior of the reaction laminate, while having a physical structure that is as simple as possible.

This object is achieved according to the present invention in that the reaction laminate and the temperature-detection laminate are embodied separately from one another.

Thanks to the separate embodiment of the reaction laminate and temperature detection laminate, the two laminates can be provided physically separately on a fluid-conveying conduit or on a fluid-receiving vessel, so that the apparatuses required for instrumental detection of the radiation proceeding from the two laminates can be provided physically separately from one another. The radiation source of the first electromagnetic radiation can thus be arranged in a manner that is physically separate, and is thus shielded, from an infrared detector, since the radiation source only has to irradiate the reaction laminate and the infrared detector only has to detect the temperature-detection laminate. The radiation source of the first electromagnetic radiation is thus eliminated as a source of interference for noncontact temperature detection by the temperature-detection laminate.

The reaction laminate and the temperature-detection laminate can furthermore be arranged in measurement environments that are optimally adapted to their respective requirements, so that detection of the second electromagnetic radiation by the reaction laminate can occur optimally, as can detection of the infrared radiation by the temperature-detection laminate.

When a "laminate" is referred to in the present Application, what is meant thereby is that this layered body, constituting a planar body, has a substantially greater dimension in two mutually orthogonal spatial directions than in its thickness direction respectively orthogonal to the two aforesaid spatial directions. The thickness direction is therefore always the shortest dimension of the laminate.

In principle, it can be sufficient for the reaction laminate and/or the temperature detection laminate to comprise only a single layer. Each of the laminates can, however, comprise a plurality of layers if that is necessary or useful for the function or intended purpose thereof.

One problem with constituting the reaction laminate and temperature-detection laminate separately involves assessing the informative value of the temperature detected at the temperature-detection laminate with regard to the actual temperature of the reaction laminate. A maximally simple solution to this can involve using an identical copy of the reaction laminate as a temperature-detection laminate, and detecting only the second electromagnetic radiation at one of the two laminates and only the infrared radiation at the respective other laminate.

Although this is a possible embodiment of the present invention, on the one hand the use of a further reaction laminate as a temperature-detection laminate is expensive and therefore economically questionable. On the other hand, without a guarantee of an actually identical configuration of the two reaction laminates, and without arrangement thereof under maximally identical operating conditions during detection of the radiation proceeding from them, a calibration is nevertheless necessary in order to allow a sufficiently accurate inference, from the infrared radiation detected at the temperature-detection laminate, as to the actual temperature of the reaction laminate. Lastly, the second electromagnetic radiation that can be excited at the luminophore can interfere with the infrared radiation of the temperature-detection laminate.

It is therefore preferred, in the interest of a maximally simple and economical design for the planar layered component arrangement according to the present invention, if the temperature-detection laminate is devoid of luminophore.

This ensures that a luminophore at the temperature-detection laminate is not inadvertently excited to emit electromagnetic radiation that might interfere with detection of the infrared radiation proceeding in temperature-related fashion therefrom. Because optimally reliable conversion of the temperature, ascertained by infrared radiation detection, of the temperature-detection laminate into a temperature (assumed or determined on the basis thereof) of the reaction laminate can or should be accomplished in any case by means of a data processing apparatus on the basis of a previously performed calibration, the physical configuration of the temperature detection laminate can be considerably simplified as compared with that of the reaction laminate. Provision can therefore be made, very generally, that the reaction laminate has, at least in portions, a layer structure that differs in terms of layer material and/or layer sequence and/or layer thickness from that of the temperature detection laminate.

Provision can be made, for example, that the two laminates (reaction laminate and temperature-detection laminate) comprise a uniform substrate ply on which different functional layers are applied, for example in one case at least one luminophore containing layer and in another case a layer intended for temperature detection by detection of infrared radiation; or the substrate ply itself serves on the temperature detection laminate directly, without a further additional functional layer, for the detection of infrared radiation and thus for temperature detection. It is then possible, because of the presence of a common layer, to embody the reaction laminate and the temperature-detection laminate as an integrally continuous laminate. The layered component arrangement can then be a one-piece layered component arrangement.

In the interest of optimum functionality of the two laminates, however, it is also conceivable for them to be constructed entirely differently, and to have completely different layer structures with regard to at least one of the aforementioned layer parameters.

In the interest of a maximally informative, accurate result from detection of the oxygen content in the fluid that is to be detected (measured-object fluid), it is advantageous if detection of the radiation proceeding from the layered component arrangement does not interfere with the fluid to be detected, and vice versa. According to an advantageous refinement of the present invention, provision is made for this purpose that the reaction laminate and the temperature-detection laminate each have a fluid-contact side on which the respective laminate is configured for contact with the measured-object fluid, and a detection side, opposite from the fluid contact side, which is configured for interaction with radiation detectors.

Noncontact optical sensing of the layered component arrangement under discussion here is preferred not only because the absence of contact reduces the risk of interference between the processes being detected and the very measurement technique being used for that purpose. Contact-based temperature detection of the temperature of the reaction laminate using measurement sensing elements and the like is also difficult or impossible because most measurement sensing elements that are sufficiently strong and robust detect temperatures (and changes in temperature) too slowly and would thus, in a context of changing temperatures, indicate a temperature that is not the actual temperature of the reaction laminate at the point in time at which an emission is detected.

Temperature sensing elements that can detect temperature changes quickly enough, conversely, have proven to be too failure-prone and too delicate to be used in a safety-critical sector such as the detection of oxygen concentrations in a respiratory gas during artificial ventilation.

Since it is consequently important that the temperature-detection laminate, if it comprises the aforementioned detection side and fluid-contact side, convey a temperature change on the fluid-contact side as quickly as possible to the detection side, it is advantageous if the temperature-detection laminate comprises a layer made of a material having the best possible thermal conductivity, which furthermore can be thin. Concretely, provision can be made for this purpose that the temperature-detection laminate comprises a metal foil.

The metal foil can in principle be any metal foil, for example a copper foil, although the latter is susceptible to oxidation specifically in an oxygen-containing environment, and its properties change as oxidation increases. What is proposed as a metal foil is therefore preferably an aluminum foil, which self-passivates and can therefore furnish consistent material properties over a long period. An aluminum foil, like other metal foils, can furthermore be embodied with sufficient strength even at a thin film thickness of less than 15 um. A metal foil, in particular the aforesaid aluminum foil, constituting part of the temperature-detection laminate or constituting said laminate, preferably has a thickness in the range from 6 to 12 um, preferably in the range from 8 to 11 um. Thanks to the high thermal conductivity furnished by metal, in particular aluminum, heat is conducted quickly through the material. The thermal path is furthermore short because the material thickness is thin (less than 15 um), so that a temperature change on the fluid-contact side is detectable within a few milliseconds on the detection side.

The reaction laminate, on the other hand, can be constructed as a known reaction laminate and can comprise, for example, a porous substrate ply, permeable to oxygen molecules, made of polyvinylidene fluoride. Any known reaction laminates are nevertheless usable in the present case on the layered component arrangement being discussed here.

In order to provide further assurance that a temperature which changes on the fluid side becomes detectable as quickly as possible on the detection side of the temperature-detection laminate, provision is made according to a refinement of the invention that an outer surface of the metal foil constitutes the fluid-contact side of the temperature-detection laminate.

Preferably at least one laminate from among the reaction laminate and temperature detection laminate is flat. Particularly preferably, both laminates are flat, so as to interfere as little as possible with any flow of the fluid whose oxygen content is to be detected. When the at least one laminate from among the reaction laminate and temperature-detection laminate is used to detect the oxygen content of a flowing fluid, the at least one laminate, preferably both laminates, can then, for minimal interference with the measured-object fluid flow, be curved around an axis of curvature that is parallel to the flow direction of the fluid at the attachment location of the at least one laminate. The at least one laminate is preferably curved only around that axis of curvature.

The laminates can be connected to the housing adhesively, for example by way of an adhesive bead that is applied on the detection side of the layered component arrangement and leaves uncovered a region, respectively provided for radiation detection, of the detection side of the respective laminate. Radiation emission from the at least one laminate, and detection thereof, are thus not interfered with by the adhesive.

Alternatively or additionally, one or both laminates can be connected to the housing by way of an adhesive tape, the adhesive tape being adhesively connected in part to the fluid-contact side and in part to the housing, leaving uncovered a region of the respective fluid-contact sides. Contact between the at least one laminate and the fluid is thus not impaired by the adhesive tape.

As a general principle, the temperature-detection laminate can comprise a substrate ply that carries a functional layer. This has already been mentioned above. The substrate ply can be, for example, the aforementioned metal foil, which can be furnished to be sufficiently stable with little thickness. On the detection side, the temperature-detection laminate can comprise an emission layer, carried by the substrate ply directly or indirectly (i.e. with interposition of further layers), having an emissivity of not less than 0.75. Even better, the emission layer has an emissivity of not less than 0.9. The higher the emissivity, the more effectively obtrusive reflection at the detection side of the temperature-detection laminate can be avoided. This provides additional assurance that the temperature-detection laminate is in fact the source of the infrared radiation detected in the vicinity of its detection side, and that said radiation has not simply been reflected at the surface of the detection side toward the corresponding detector.

As a general principle, it is not to be ruled out that the emission layer and the substrate ply are identical in terms of material, and that the emission layer is constituted on the detection side by mechanical and/or chemical roughening of the surface of the substrate ply on the detection side. This is appropriate especially with substrate plies having a high material-inherent emissivity of more than 0.75.

Because the metal foil which is preferred as a substrate ply will often have undesirably highly reflective surfaces, however, a separate emission layer on the substrate ply can be advantageous. In order to allow maximally advantageous emission behavior in the infrared wavelength region to be obtained, it is advantageous if the emission layer contains color pigments. The color of the color pigments plays only a subordinate role, since many color pigments are "black" in the infrared wavelength region and thus furnish a sufficiently high emissivity. The use of color pigments that are anthracite-colored or black is nevertheless preferred.

In experiments, a carbon-containing layer has proven successful. The emission layer can be applied, for example, as a carbon-containing paint. For example, a carbon containing conductive paint of Peters GmbH & Co. KG in Kempen (DE), having the designation "SD 2843 HAL," has proven to be suitable.

An epoxy can also constitute the emission layer. Epoxies can also be applied onto the substrate with a thin layer thickness, for example using printing technology or by spraying. They form an advantageously strong, robust surface after curing. Possible advantageous epoxies for constituting an emission layer are obtained from Polytec PT GmbH in Waldbronn (DE) under the product designation EP 601 or EP 653, of USP Class VI. When these epoxies are used they should preferably be filled with color pigments, once again preferably with black color pigments for the reasons recited above.

Because the layered component arrangement under discussion here is suitable and intended for direct detection of the oxygen partial pressure of a fluid and, derived therefrom, the oxygen content of the fluid, the present invention also relates to a reaction subassembly encompassing a housing and a layered component arrangement as described and refined above which is provided in the housing; the housing comprising an opening through which a fluid is introducible into the housing; the housing comprising a reaction window through which the reaction laminate is reachable by the first electromagnetic radiation and which is penetrable by the second electromagnetic radiation; and the housing comprising a temperature sensing window, arranged physically remotely from the reaction window, which is penetrable by the infrared radiation emitted from the temperature-detection laminate.

The measured-object fluid whose oxygen partial pressure is to be detected is introducible into the housing for detection. With the windows (reaction window and temperature-detection window) that are embodied separately from one another and physically remotely from one another, the electromagnetic radiation proceeding from the respective laminates (reaction laminate and temperature-detection laminate) can be detected at locations located physically remotely from one another, so that the electromagnetic radiations involved cannot interfere with one another.

In order to equip the housing in maximally optimum fashion for detection of the electromagnetic radiation proceeding on the one hand from the reaction laminate and on the other hand from the temperature-detection laminate, the reaction window can be configured physically differently from the temperature-detection window.

The physically different configuration can be expressed firstly by a different selection of material. Alternatively or additionally, provision can be made that the reaction window is thicker than the temperature-detection window. A zero thickness of the temperature-detection window is expressly to be included in this context. A sufficiently thick configuration of the reaction window is also advantageous because the reaction window not only must enable passage of the first and the second electromagnetic radiation, but also is intended to shield the reaction laminate on the detection side from contact with oxygen that does not derive from the measured object fluid.

A thinner configuration of the temperature-detection window makes it possible, when a material that is optimally transparent to infrared radiation is not available, at least to make the less-optimum material sufficiently thin that it presents as little interference as possible.

Selection of a material transparent to infrared radiation can be dispensed with, however, if the solution resorted to is the one already indicated above, namely a temperature-detection window having a thickness of zero. Provision is correspondingly made, according to a particularly preferred refinement of the present invention, that the reaction window comprises a material that is transparent to light in the optically perceptible wavelength region; and that the temperature-detection window encompasses a hole that passes through the housing in its thickness direction and is covered by the temperature-detection laminate.

Especially when the temperature-detection laminate comprises the metal film recited above as preferred, the hole that passes through a housing wall as a temperature detection window can be covered securely and permanently with the temperature detection laminate. The detection side of the temperature-detection laminate is then preferably exposed in the hole for any infrared detector arrangement that may be provided.

The hole that passes through the housing and constitutes a temperature-detection window preferably has a cross-sectional hole area that increases with increasing approach from the housing side facing away from the temperature-detection laminate toward the housing side located closest to the temperature-detection laminate. The hole is preferably embodied so as to open negatively conically toward the temperature-detection laminate, so that it can correspond at least approximately to a detection cone of an infrared detector for detecting infrared radiation proceeding from the temperature-detection laminate.

In order to avoid external interfering influences, the housing surface delimiting the hole between the outer side and inner side of the housing can be coated, in particular mirror-coated. It is thereby possible to prevent a housing made of transparent material from acting as an optical guide and directing to the temperature detection window electromagnetic radiation that does not proceed, as infrared radiation, from the temperature-detection laminate.

In principle, the housing can be cup-shaped, i.e. embodied with only one opening through which measured-object fluid can be introduced and then discharged. A housing of this kind can be used, for example, to determine an oxygen partial pressure of oxygen dissolved in liquid. For use in a ventilation apparatus, however, a housing that is flowthrough-capable for the measured-object fluid is advantageous. It is therefore preferred that the housing comprise a further opening, different from the opening and located remotely therefrom, in such a way that the housing is flowthrough-capable for fluid between the opening and the further opening.

It is thus possible in principle to arrange the reaction subassembly advantageously in a ventilation apparatus in the main ventilation gas flow. A preferably compact reaction subassembly can be obtained by providing the layered component arrangement between the opening and the further opening.

The housing is preferably flowthrough-capable in a straight line, in order to minimize eddying of the fluid to be detected as it passes through the housing and thus travels past the layered component arrangement.

In order to implement the particularly advantageous application of the reaction subassembly under discussion here in a ventilation apparatus, provision is made according to an advantageous refinement of the present invention that the reaction subassembly is embodied for placement in a ventilation conduit arrangement of a ventilation apparatus; the reaction subassembly being embodied, in the region both of the opening and of the further opening, with a respective attachment configuration for connection to a respective portion of the ventilation conduit arrangement.

Advantageously, the reaction subassembly is embodied as an oxygen measurement cuvette. A measurement cuvette of this kind as a rule comprises at least one housing portion configured as a parallelepiped. The reaction subassembly is preferably arranged in such a parallelepipedal portion of the housing; a surface, preferably flat or curved only around one axis of curvature, of the parallelepipedal portion of the housing preferably comprises both the reaction window and the temperature detection window.

Because the reaction subassembly described above serves for sensorial detection of the oxygen partial pressure and, derived therefrom, the oxygen content of a fluid, the present Application further relates to a sensor arrangement encompassing a reaction subassembly as described and refined above, and further encompassing a detector subassembly, having:
  a radiation source that is embodied to emit the first electromagnetic radiation through the reaction window;
  a radiation detector that is embodied to detect the second electromagnetic radiation through the reaction window; and
  an infrared detector that is embodied to detect, through the temperature-detection window, the infrared radiation emitted from the temperature-detection laminate.

In order to minimize mutual radiation interference, the infrared detector and the radiation source are preferably arranged in measurement spaces that are shielded from one another in terms of the first electromagnetic radiation and the infrared radiation.

Although what is envisioned in the context of utilization of the sensor arrangement is preferably utilization in a ventilation apparatus or in interaction therewith, be it noted that the sensor arrangement is embodied in principle to detect any oxygen partial pressures of oxygen dissolved in a fluid. The fluid is, however, preferably respiratory gas.

In order to allow a high level of component hygiene to be ensured in the context of the reaction subassembly that comes directly into contact with the fluid, it is advantageous (as already mentioned above) if the detector subassembly is connectable or connected detachably to the reaction subassembly. The substantially more expensive detector subassembly can thus be used, sequentially in time, with several reaction subassemblies for the detection of oxygen contents in fluids.

The aforementioned reaction subassembly is therefore preferably a single-use or disposable reaction subassembly that, for example in clinical use, can be disposed of after being used once on one patient. For maximally simple and definite, in particular unambiguous, detachable connection of a reusable detector subassembly to the reaction subassembly, in particular to the reaction subassembly embodied as an oxygen measurement cuvette, embodiment of the parallelepipedal portion as a cuboidal portion is preferred. Advantageously, the cuboidal portion can comprise enveloping-side surface pairs of different widths, in order to prevent incorrect attachment of the detector subassembly to the housing, in particular to the measurement cuvette.

As explained earlier in connection with the layered component arrangement, calibration of the noncontact infrared-based temperature detection of the temperature-detection laminate using the actual temperature of the reaction laminate which is of interest can be necessary or at least advantageous in order to obtain a maximally accurate luminophore-based result from detection of the oxygen content in the measured-object fluid. Provision can be made for this purpose that the sensor arrangement is signal-transferringly connected to an electronic evaluation apparatus that comprises at least a data memory and a data processing processor in data exchanging communication with the data memory, calibration information for correlating detected infrared radiation of the temperature-detection laminate with the temperature of the luminophore being stored in the data memory.

The temperature of the luminophore is equivalent to the temperature of the reaction laminate, the temperature of the detection side of the reaction laminate being of particular interest.

The calibration can be accomplished in advance, for the specific layered component arrangement or specific reaction subassembly or for a class of laminates or reaction subassemblies, in the laboratory. For this, the two laminates can be brought successively to thermal equilibrium states at temperatures that are each different but are uniform and known. For each equilibrium state, the detected value of the infrared radiation emitted from the temperature-detection laminate can then be associated with the respective known equilibrium temperature of the reaction laminate.

In order to check that the temperature-detection laminate is tracking a change in the temperature of the reaction laminate sufficiently quickly, the two fluid-contact sides can be brought into contact with a temperature source having a known temperature that changes over time in a known manner, and the temperatures of the detection sides of the two laminates can be detected in noncontact fashion as a function of time.

From the data thereby obtained, a highly accurate calibration relationship can be obtained between a temperature detected in noncontact fashion at the detection side of the temperature-detection laminate and the temperature of the detection side of the reaction laminate, and thus the temperature of the luminophore present therein.

The electronic evaluation apparatus can furthermore contain calibration information for correlating second electromagnetic radiation detected by the radiation detector with an oxygen concentration value or oxygen content value of the measured-object fluid. As discussed earlier, the second electromagnetic radiation detected by the radiation detector, or that radiation's relationship to the exciting first electromagnetic radiation in terms of time and/or intensity, correlates directly with the partial pressure of the oxygen in the measured-object fluid. The oxygen concentration or oxygen content of the fluid can nevertheless be readily ascertained or calculated from the detected partial pressure.

Because the preferred application instance of the above-described sensor arrangement is interaction thereof with a ventilation apparatus for artificial ventilation, the present invention further relates to a ventilation apparatus for artificial ventilation, having:
- a respiratory gas source;
- a ventilation conduit arrangement extending between the respiratory gas source and a patient-side proximal end;
- a valve arrangement encompassing an inhalation valve and an exhalation valve;
- a flowthrough sensor arrangement for quantitative detection of a gas flow in the ventilation conduit arrangement;
- a pressure modification arrangement for modifying the gas pressure of the gas flowing in the ventilation conduit arrangement; and having
- a control device that is configured at least to control the operation of the pressure modification arrangement on the basis of measurement signals of the proximal flowthrough sensor; and
- a sensor arrangement as presented above and advantageously refined, for ascertaining an oxygen content of gas flowing in the ventilation conduit arrangement.

A "respiratory gas source" is understood very generally to be any type of respiratory gas source that serves to introduce respiratory gas into the ventilation conduit arrangement. It can be an attachment configuration of the ventilation apparatus which is embodied for connection to a respiratory gas reservoir that is replaceable or is installed in permanent stationary fashion. It can also be a pump that, in the respiratory gas apparatus, aspirates gas from a reservoir (which can also be the external environment), and introduces it into the ventilation conduit arrangement. A pump of this kind can also be configured as a fan.

A "pressure modification arrangement" is to be understood as any apparatus that is suitable and intended for modifying the pressure of the respiratory gas flowing in the ventilation conduit arrangement. When the respiratory gas source is merely an attachment configuration for connection to a gas reservoir installed in stationary fashion, it can be a valve arrangement for pressure reduction. When the respiratory gas source comprises the aforementioned pump or fan, the pressure modification arrangement can itself encompass, or can in fact be, parts or the entirety of the respiratory gas source, for example the pump or the fan, whose output can be modified by the control device. Even when the respiratory gas source is constituted by the aforementioned pump or fan, the pressure modification arrangement, in addition to the respiratory gas source, can itself encompass a pressure reduction valve or can be constituted exclusively by a pressure reduction valve, for example if the pump or fan runs at a constant load.

The control apparatus preferably encompasses the aforementioned electronic evaluation apparatus of the sensor arrangement, or is the latter apparatus.

The sensor arrangement is preferably arranged in the main respiratory gas flow, so that it can directly detect at least one flow from among the inhalatory and the exhalatory respiratory gas flow. The sensor arrangement is preferably provided in the ventilation conduit arrangement in such a way that it can detect both an exhalatory and an inhalatory respiratory gas flow. The sensor arrangement can be arranged for that purpose close to the patient, i.e. proximally, preferably between a Y connection with which separate exhalatory and inhalatory ventilation conduit portions are combined in a direction toward the patient, and an endotracheal tube on the patient.

BRIEF DESCRIPTION OF THE DRAWING FIGURES

Also preferably, the sensor arrangement is arranged between the point at which separate exhalatory and inhalatory ventilation conduit portions combine in a direction toward the patient, and the flowthrough sensor.

The present invention will be explained in further detail below with reference to the appended drawings, in which.

DETAILED DESCRIPTION OF THE PREFERRED EMBODIMENTS

Figure 1:
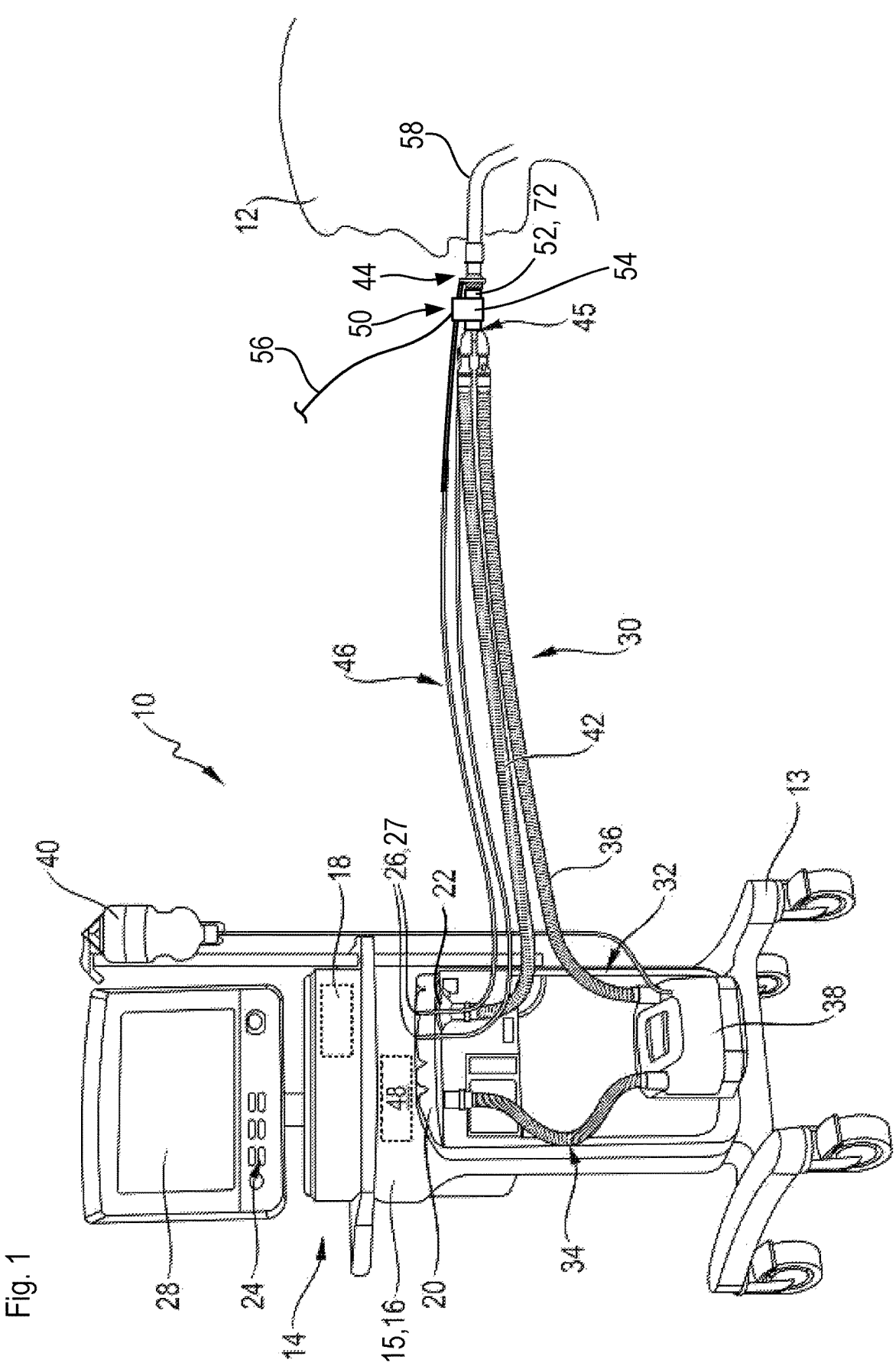
FIG. 1 depicts a preferred but nonetheless merely exemplifying application of the layered component arrangement, reaction subassembly, and sensor arrangement according to the present invention, in a ventilation apparatus according to the present invention.

In order to explain the preferred area of application of the subject matters discussed in the present Application (layered component arrangement, reaction subassembly, sensor arrangement, and ventilation apparatus), a ventilation apparatus utilizing the aforesaid components will firstly be explained in conjunction with FIG. 1.

In FIG. 1, an embodiment according to the present invention of a ventilation apparatus is labeled in general with the number 10. In the example depicted, ventilation apparatus 10 serves for artificial ventilation of a human patient 12.

Ventilation apparatus 10, constituting a mobile ventilation apparatus 10, can be received on a rollable frame 13.

Ventilation apparatus 10 comprises a housing in which a pressure modification apparatus 16 and a control device 18 (not visible from outside because of the opaque housing material) can be received.

Pressure modification arrangement 16 is constructed in a manner known per se and comprises a respiratory gas source 15 in the form of a pump, a compressor, or a fan; these can each be controlled in modifiable-load fashion and therefore serve not only to introduce respiratory gas into the ventilation apparatus but also to modify the pressure of the respiratory gas that is introduced. Alternatively, respiratory gas source 15 can also be constituted by a pressure container that is attachable to housing 14 of ventilation apparatus 10. Pressure modification arrangement 16 can comprise respiratory gas source 15 and, if applicable, additionally (or, in the case of a pressurized gas reservoir constituting a respiratory gas source, alternatively) a reducing valve and the like. Ventilation apparatus 10 furthermore comprises, in a manner known per se, an inhalation valve 20 and an exhalation valve 22.

Control device 18 is usually implemented as a computer or microprocessor. It encompasses a data memory device (not depicted in FIG. 1) so that data necessary for the operation of ventilation apparatus 10 can be stored and, if necessary, retrieved. In a network operation context, the memory device can also be located outside housing 14 and can be connected to control device 18 via a data transfer connection. The data transfer connection can be constituted by a cable link or a radio link. So that disruptions of the data transfer connection can be prevented from affecting the operation of ventilation apparatus 10, however, the memory device is preferably integrated into control device 18 or is at least received in the same housing 14 as it.

For the input of data into ventilation apparatus 10, or more precisely into control device 18, ventilation apparatus 10 comprises a data input 24 that is represented, in the example depicted in FIG. 1, by a keypad. Alternatively or in addition to the keypad that is depicted, control device 18 can receive data via various data inputs, for example via a network lead, a radio link, or via sensor terminals 26 that will be discussed in detail below.

Ventilation apparatus 10 can comprise an output device 28, in the example depicted a display screen, in order to output data to the therapist performing treatment.

For artificial ventilation, patient 12 is connected via a ventilation conduit arrangement 30 to ventilation apparatus 10, more precisely to pressure modification arrangement 16 in housing 14. Patient 12 is intubated for this purpose with an endotracheal tube 58.

Ventilation conduit arrangement 30, through which fresh respiratory gas can be directed from respiratory gas source 15 and pressure modification arrangement 16 into the lungs of patient 12, comprises an inhalation hose 32 outside housing 14. Inhalation hose 32 can be interrupted, and can comprise a first partial inhalation hose 34 and a second partial inhalation hose 36 between which a conditioning device 38, for controlled humidification and optionally also temperature control of the fresh respiratory gas delivered to patient 12, can be provided. Conditioning device 38 can be connected to an external fluid reservoir 40 by way of which water for humidification, or also a medication e.g. to inhibit inflammation or to dilate the airways, can be delivered to the respiratory gas. When the present ventilation apparatus 10 is used as an anesthesia ventilation apparatus, it is thereby possible to deliver volatile anesthetics in controlled fashion via ventilation apparatus 10 to patient 12. Conditioning device 38 ensures that the fresh respiratory gas is conveyed to patient 12 with a predetermined moisture content, optionally with addition of a medication aerosol, and at a predetermined temperature.

Ventilation conduit arrangement 30 comprises, in addition to inhalation valve 20 already mentioned, exhalation valve 22 and furthermore an exhalation hose 42 through which metabolized respiratory gas from the lungs of patient 12 is exhausted into the atmosphere.

Inhalation hose 32 is coupled to inhalation valve 20, and exhalation hose 42 to exhalation valve 22. Only one of the two valves is open at one time for passage of a gas flow. Actuation control of valves 20 and 22 is also effected by control device 18.

During a ventilation cycle, firstly exhalation valve 22 is closed and inhalation valve 20 is opened for the duration of the inhalation phase, so that fresh respiratory gas can be directed from housing 14 to patient 12. A flow of fresh respiratory gas is produced by pressure modification arrangement 16 by controlled elevation of the pressure of the respiratory gas. As a result of the pressure elevation, the fresh respiratory gas flows into the lungs of patient 12 where it expands the body region in the vicinity of the lungs, i.e. in particular the thorax, against the individual elasticity of the body parts near the lungs. The gas pressure in the interior of the lungs of patient 12 also rises as a result.

At the end of the inhalation phase, inhalation valve 20 is closed and exhalation valve 22 is opened. The exhalation phase begins. Because the gas pressure of the respiratory gas present in the lungs of patient 12 has been elevated until the end of the inhalation phase, said gas flows into the atmosphere after exhalation valve 22 is opened, while the gas pressure in the lungs of patient 12 decreases as the flow continues. When the gas pressure in lungs 12 reaches a positive final exhalation pressure that is set on ventilation apparatus 10, i.e. a pressure slightly higher than atmospheric pressure, the exhalation phase is terminated with the closing of exhalation valve 22, and is followed by a further ventilation cycle.

During the inhalation phase, the so-called ventilation tidal volume, i.e. the volume of respiratory gas for each breath, is delivered to patient 12. The ventilation tidal volume multiplied by the number of ventilation cycles per minute, i.e. multiplied by the ventilation frequency, equals the volume per minute of artificial ventilation being performed in the present case.

Ventilation apparatus 10, in particular control device 18, is preferably embodied to repeatedly update or ascertain, during ventilation operation, ventilation operating parameters that characterize the ventilation operation of ventilation apparatus 10, in order to ensure that ventilation operation is coordinated as optimally as possible, at every point in time, with patient 12 who is respectively to be ventilated. Particularly advantageously, the determination of one or several ventilation operation parameters is made at the ventilation frequency, so that ventilation operating parameters that are current, and are thus optimally adapted to patient 12, can be furnished for each ventilation cycle.

Ventilation apparatus 10 is data-transferringly connected for this purpose to one or several sensors that monitor the status of the patient and/or monitor operation of the ventilation apparatus.

One of these sensors is a proximal flow sensor 44 that is arranged at that end of a Y-connector piece 45 which is located closer to patient 12, and detects the ventilation gas flow existing at that point in ventilation conduit arrangement 30. Flow sensor 44 can be coupled by means of a sensor lead arrangement 46 to data inputs 26 of control device 18. Sensor lead arrangement 46 can, but does not need to, encompass electrical signal transfer leads. It can likewise comprise hose conduits that transfer the gas pressure existing in a flow direction on either side of flow sensor 44 to data inputs 26, where that pressure is quantified by pressure sensors 27. Flow sensor 44 is preferably a flow sensor operating on the differential pressure principle, but can also be a flow sensor operating in accordance with a different physical operating principle.

Provided in housing 14 is a further flow sensor 48 that is referred to, because of its greater distance from patient 12 compared with the proximal flow sensor 44, as a "distal" flow sensor 48.

Figure 5:
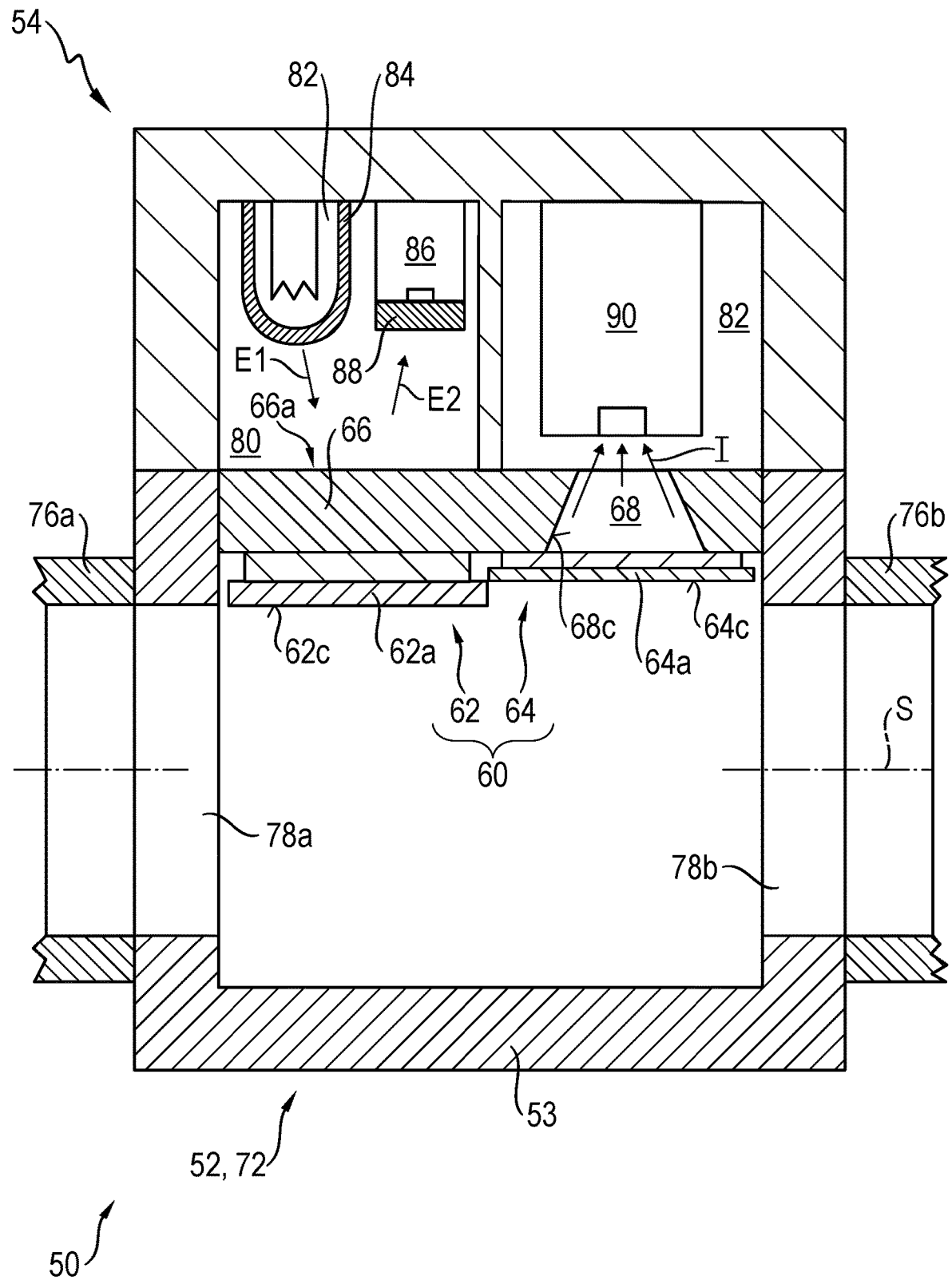
FIG. 5 is a schematic cross-sectional view through a sensor arrangement according to the present invention, having the reaction subassembly of FIG. 4, which is utilized as a sensor arrangement on the ventilation apparatus of FIG. 1.

A sensor arrangement 50, encompassing a reaction subassembly 72 having a housing 52 embodied as a measurement cuvette 52 and a detector subassembly 54, is arranged in ventilation conduit arrangement 30 between Y-connector piece 45 and flow sensor 44, in order to detect the oxygen content of the respiratory gas in both the exhalatory and the inhalatory main respiratory gas flow. Sensor arrangement 50, which will be explained in further detail below in conjunction with FIG. 5, is coupled via a signal lead 56 to control device 18 and transfers to the latter, for further evaluation, the detection results of its detector subassembly 54.

Calibration information is stored in the data memory device of control device 18 so that the detection results of sensor arrangement 50 can be very accurately evaluated.

Sensor arrangement 50 is embodied for temperature-compensated luminophore based detection of the partial pressure of the oxygen contained in the respiratory gas flowing through housing 52. Both temperature compensation, and conversion of the detection results obtained directly in conjunction with the oxygen partial pressure into an oxygen concentration or oxygen content of the respiratory gas, are performed by control device 18 based on the stored calibration information.

Figure 2A:
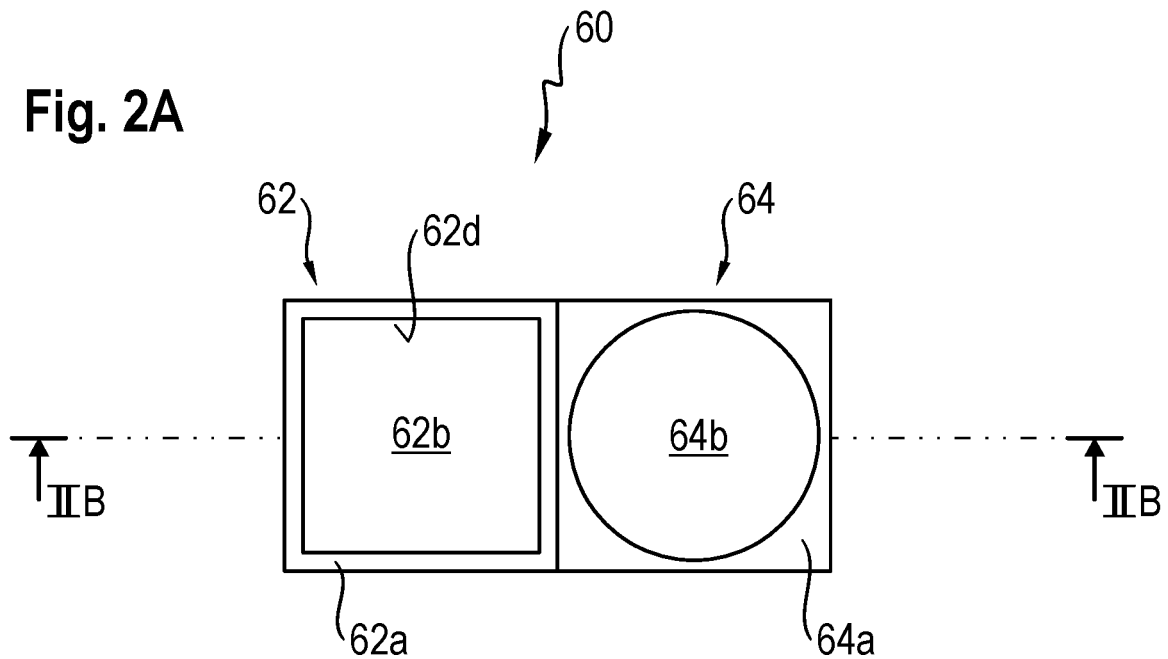
FIG. 2A is a schematic plan view of a planar layered component arrangement according to the present invention of the present application.
Figure 2B:
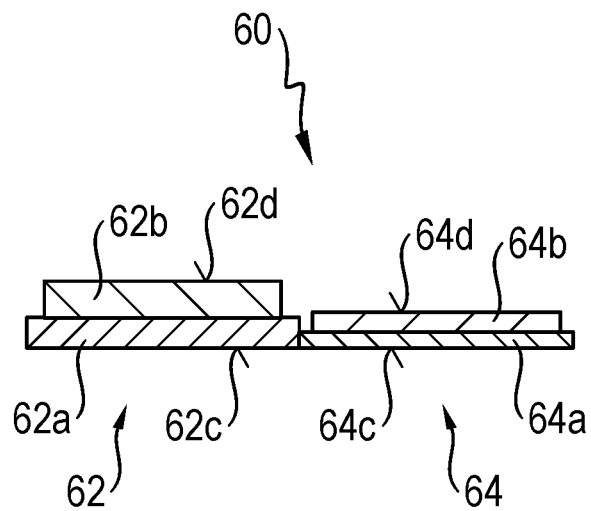
FIG. 2B is a section view through the layered component arrangement of FIG. 2A, along section plane IIB-IIB of FIG. 2A.

Luminophore-based detection of an oxygen content in a fluid is known per se. In the present exemplifying embodiment it is accomplished with the participation of a layered component arrangement of the present invention which is depicted in FIGS. 2A and 2B and is labeled in general with the number 60. It encompasses, for optical detection of an oxygen content of the measured-object fluid, such as that of the aforementioned respiratory gas, a reaction laminate 62 (see also FIG. 2B), which in the present case is depicted as a two-ply reaction laminate 62. Reaction laminate 62 can in fact comprise only one layer, or also more than two layers. In the example depicted, and also as evident in the cross-sectional view of FIG. 2B, reaction laminate 62 comprises a substrate ply 62a and a luminophore-containing reaction layer 62b applied thereonto.

The relationships of the length and width of reaction laminate 62 to its thickness are not to scale in the Figures. Reaction laminate 62, depicted in FIGS. 2A and 2B as square, can have an edge length of approximately 7 to 10 mm, and its thickness, measured over both layers 62a and 62b, can be approximately 300 um.

Substrate ply 62a can be constituted from a material that is sufficiently porous with respect to oxygen molecules, for example polyvinylidene fluoride. Substrate ply 62a can be cut out from a corresponding film and can have a thickness of between 100 and 150 um. In some circumstances the thickness of the substrate ply can also be less.

Luminophore-containing reaction layer 62b can likewise contain polyvinylidene fluoride as a matrix material into which luminophores are embedded.

Reaction laminate 62 has a fluid-contact side 62c and a detection side 62d.

Luminophore-containing reaction layer 62b can be embodied to be slightly smaller than substrate ply 62a that carries it, in order to simplify adhesive mounting of reaction laminate 62 on the detection side onto a window component or generally a housing, without thereby requiring the detection side of luminophore-containing reaction layer 62b to be coated with adhesive.

As will be explained below in conjunction with FIG. 5 and as is generally known in principle, reaction layer 62b is irradiated with a first electromagnetic radiation of a first wavelength and is thereby excited to emit a second electromagnetic radiation having a second, as a rule longer, wavelength. The intensity and the duration of the excited second electromagnetic radiation depend on the presence of oxygen, more precisely on contact between the luminophores embedded in reaction layer 62b and oxygen. The emission behavior of reaction layer 62b is furthermore temperature dependent.

For temperature compensation of the detection of the emission behavior of reaction laminate 62, layered component arrangement 60 comprises a temperature-detection laminate that, in the example depicted, occupies an area identical in size to that of reaction laminate 62, although this is not obligatorily necessary.

The depiction of temperature-detection laminate 64 is also not to scale in terms of its dimensions. In the example depicted it has an edge length in the same range as reaction laminate 62, but because its construction differs from that of reaction laminate 62 it is preferably thinner than the latter.

Temperature-detection laminate 64 once again comprises a substrate ply 64a that, in the interest of optimum thermal conduction, is constituted by way of example from an aluminum foil having a thickness of approximately 10 um or even less.

In the exemplifying embodiment depicted, a detection layer 64b, for example made of a carbon-containing paint, is applied onto substrate ply 64a. As indicated by way of example in the introductory part of the specification, the carbon-containing paint encompasses carbon as a black color pigment and therefore has a very high emissivity of more than 0.9.

Figure 3A:
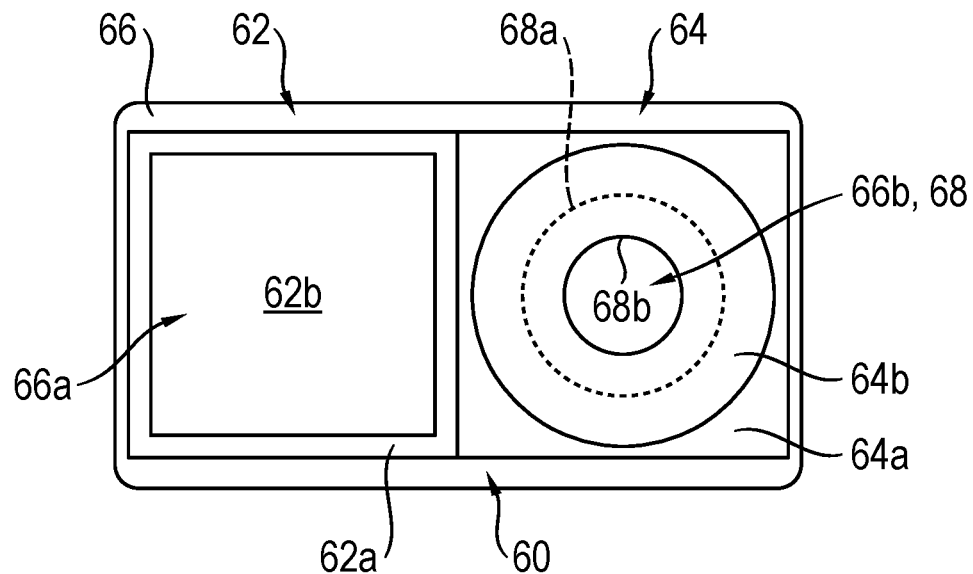
FIG. 3A is a plan view of a subassembly encompassing the layered component arrangement of FIGS. 2A and 2B and a window component of a housing, receiving the layered component arrangement, of a reaction subassembly.
Figure 3B:
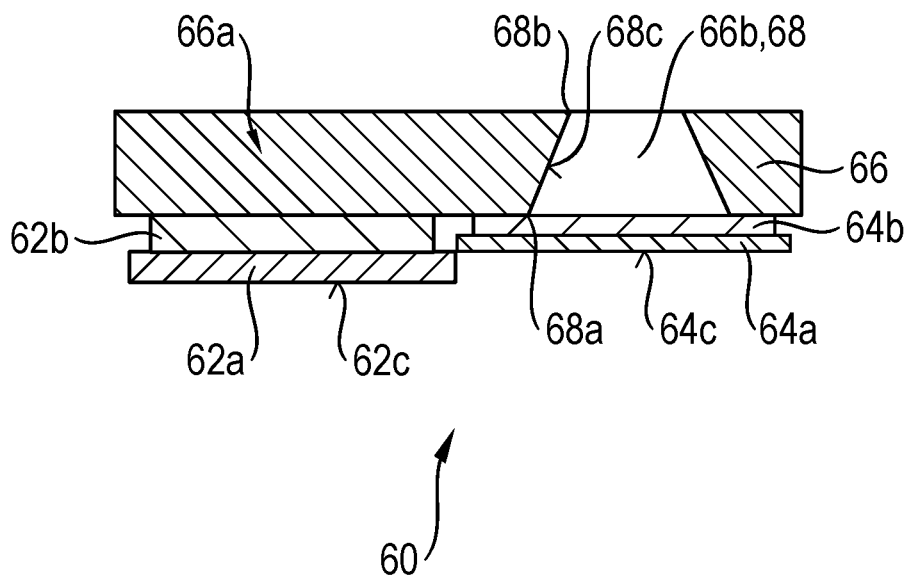
FIG. 3B is a section view through the subassembly of FIG. 3A, along section plane IIIB-IIIB of FIG. 3A.

Because, as will be explained below in conjunction with FIGS. 3A and 3B, the infrared radiation proceeding from detection layer 64b is detected through a, for example circular, hole 68 that has a constantly circular cross section along its hole axis along which hole 68 extends, detection layer 64b is also embodied as a circular surface on substrate ply 64a that is, for example, of square configuration.

That surface of substrate ply 64a which faces away from detection layer 64b is exposed, constituting a fluid-contact side 64c. It is constituted by the metallic surface of the aluminum foil which forms substrate ply 64a of temperature-detection laminate 64. Detection side 64d of temperature-detection laminate 64 constitutes the exposed surface of detection layer 64b. Fluid can therefore flow past layered component arrangement 60 on its fluid-contact side 62c, 64c; oxygen travels through substrate ply 62a to luminophore-containing reaction layer 62b where it causes quenching of an excitation generated by the first electromagnetic radiation, while the fluid contact on fluid-contact side 64c of temperature-detection laminate 64 serves only to transfer heat from the fluid to temperature-detection laminate 64.

Because of the material (aluminum) selected for substrate ply 64a, and because it is thin, substrate ply 64a assumes within milliseconds the temperature of the fluid flowing past it on its fluid-contact side 64c, and also ensures temperature equalization of detection layer 64b, so that a temperature value that is at least correlated with the temperature of the measured-object fluid can be detected by an infrared detector on detection side 64d of temperature-detection laminate 64. Because reaction laminate 62 comes into contact with the same fluid in approximately the same manner, detection of the temperature of detection side 64d of temperature-detection laminate 64 makes possible, based on the calibration information stored in the data memory device of control device 18, inferences as to the temperature of detection side 62*d* of reaction layer 62*b*, this being a prerequisite for temperature compensation of the measurement results obtained at reaction laminate 62 regarding the oxygen content of the measured-object fluid.

Temperature compensation is necessary because the temperature of the measured object fluid can change as it flows past layered component arrangement 60, for example because in the ventilation apparatus of FIG. 1, the temperature of the ventilation air delivered to a patient is lower than when it is returned by exhalation after breathing out.

Layered component arrangement 60 is therefore usually arranged in housing 52 which guides the flow of the measured-object fluid while its oxygen content, and the temperature, are being detected.

Detection sides 62*d* and 64*d* of the two laminates 62 and 64 are advantageously directed outward, i.e. away from the measured-object fluid, while fluid-contact sides 62*c*, 64*c* of the two laminates come into contact with the fluid over the largest possible area.

In order to ensure that only oxygen dissolved in the measured-object fluid reaches reaction layer 62*b*, the reaction laminate is covered on its detection side by a window. FIG. 3A shows layered component arrangement 60 of FIGS. 2A and 2B in the plan view of FIG. 2A, with a window component 66 arranged thereabove. Window component 66 is part of housing 52, shown in FIG. 1, of sensor arrangement 50. The window component can be constituted from a transparent polyamide, or also from another plastic that is transparent to the first and the second electromagnetic radiation. Window component 66 can be constituted, for example, from the amorphous polyamide that is offered under the name "Grilamid TR" by EMS-Chemie AG in Domat (CH).

In its region located directly above reaction layer 62*b*, window component 66 thus forms a reaction window 66*a* through which the first electromagnetic radiation reaches reaction layer 62*b*, and through which the emitted second electromagnetic radiation, excited thereby, is transmitted.

In order to allow the infrared radiation emitted from detection layer 64*b* of temperature-detection laminate 64 to be detected with minimal distortion, there is embodied in window component 66, directly above the location at which the temperature-detection laminate is arranged, a detection window 66*b* which is embodied as a hole 68 that widens in negatively conical fashion from the side facing away from layered component arrangement 60 to detection layer 64*b*, and that passes through the entire thickness of window component 66.

The circular hole edge 68*a* on that side of window component 66 which faces toward detection layer 64*b* is larger in diameter than the concentric hole edge 68*b* of hole 68 on that side of window component 66 which faces away from detection layer 64*b*. The negatively conical hole wall 68*c* extending between the two hole edges 68*a* and 68*b* is preferably coated, particularly preferably mirror-coated, in order to minimize or rule out interference from radiation components that might be guided through window component 66.

Figure 4:
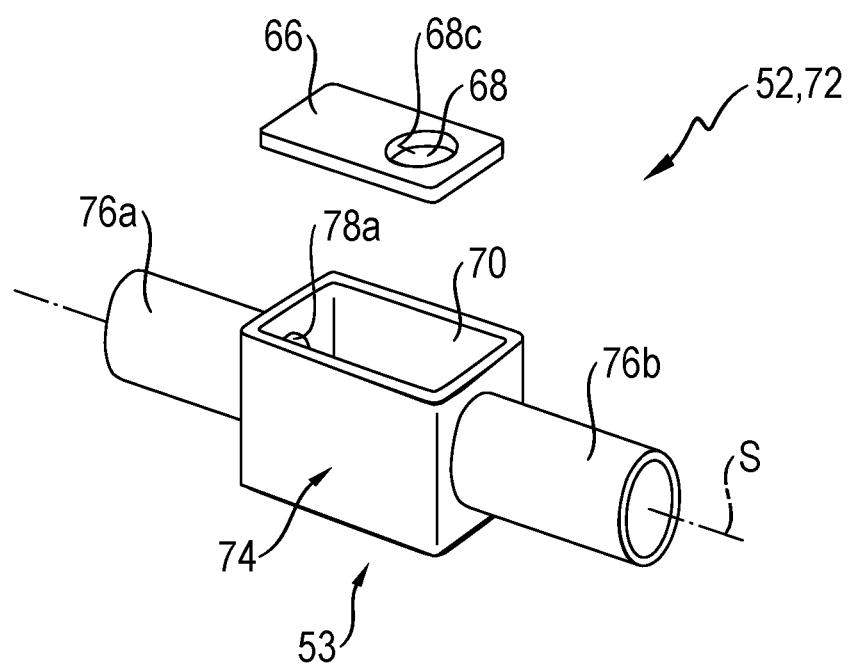
FIG. 4 shows a reaction subassembly according to the present invention of the present application.

FIG. 4 depicts housing 52 of sensor arrangement 50 in a kind of exploded view.

Housing 52 encompasses a base housing 53 and window component 66 having layered component arrangement 60 that is arranged therein but is not visible in FIG. 4. An opening 70 in base housing 53 can be closed off with window component 66, so that housing 52 is then sealed and, because of the arrangement of layered component arrangement 60 therein, forms reaction subassembly 72.

Housing 52 comprises, on both sides of parallelepipedal portion 74 that is constituted with the participation of window component 66, attachment fittings 76*a* and 76*b* for the attachment thereonto of ventilation conduit portions.

Housing 52 is flowthrough-capable bidirectionally along flow axis S.

FIG. 5 schematically depicts sensor arrangement 50 in cross section.

Respiratory gas can flow through housing 52 bidirectionally, between its two openings 78*a* and 78*b*, along flow axis S. The respiratory gas contacts fluid-contact sides 62*c* and 64*c* of laminates 62 and 64 as it flows past them. Flow axis S lies in the drawing plane of FIG. 5.

Sensor arrangement 54, which can be arranged detachably on housing 52 and which for that purpose surrounds parallelepipedal portion 74 in U-shaped fashion on three sides, the base of the "U" being located opposite window component 66, encompasses two measurement chambers 80 and 82 that are physically separate from one another.

Provided in measurement chamber 80 is a radiation source 82, for example in the form of an LED, which emits electromagnetic radiation E1 of a first wavelength. In order to keep the wavelength band of the first electromagnetic radiation proceeding from radiation source 82 as narrow as possible, and to avoid spurious radiation, radiation source 82 can advantageously be surrounded by a filter body 84 that allows first electromagnetic radiation E1, having the aforesaid wavelength, to pass with the narrowest possible tolerance.

Also arranged in first measurement chamber 80 is a radiation detector 86 that detects a second electromagnetic radiation E2 which proceeds from reaction layer 62*b* after the latter is excited by first electromagnetic radiation E1. Radiation detector 86 can also have a radiation filter 88 in front of it in order to allow the passage only of second electromagnetic radiation E2, having its second wavelength that is different from the first wavelength. With filter arrangements 84 and 88 it is possible to ensure that no radiation travels directly from radiation source 82 to radiation detector 88, creating "noise" in the signal detected there.

The signal outputted by radiation detector 86 as a result of its detection of second electromagnetic radiation E2 is transferred via data lead 56 (shown in FIG. 1) to control device 18. It is indicative, in a manner known per se, of the oxygen partial pressure in the fluid flowing through housing 52.

An infrared detector 90, which detects infrared radiation I emitted from detection layer 64*b*, is arranged in second measurement chamber 82. The signal outputted from infrared detector 90 as a result of its detection of infrared radiation I is also transferred via data lead 56 to control device 18. This signal is indicative of a temperature of detection layer 64*b*.

Based on the calibration information that is stored in the data memory device of control device 18 and was ascertained remotely in the laboratory before the deployment of layered component arrangement 60, control device 18 can ascertain from the detected signal of infrared detector 90 the temperature of reaction layer 62*b* for each point in time at which a signal of radiation detector 86 is detected, and can thereby compensate the detected signal of radiation detector 86 with reference to the temperature of the emitting reaction laminate 62 or of reaction layer 62*b* thereof. The result is a highly accurate determination of the oxygen partial pressure in the fluid flow through housing 52, as a value varying over time.

Highly accurate temperature compensation is achieved here with extremely simple means, for example metal foil 64a as a substrate and detection layer 64b applied thereonto. The use of metal foil 64a (aluminum foil) makes it possible to penetrate completely through window component 66, or housing 52 in general, in order to constitute a detection window 68, so that temperature information emitted as infrared radiation from detection layer 64b reaches infrared detector 90 with as little distortion as possible.

Control device 18 can contain, in a data memory, further calibration information that makes possible the usual conversion of the oxygen partial pressure of the fluid, which is directly correlated with the detection of the second electromagnetic radiation, into an oxygen content of said fluid.

The invention claimed is:

1. A reaction subassembly, comprising a housing and a layered component arrangement for temperature-compensated optical detection of an oxygen content of a fluid, which is provided in the housing, said layered component arrangement comprising a luminophore-containing reaction laminate having a luminophore that is excitable by irradiation with a first electromagnetic radiation of a first wavelength, to emit a second electromagnetic radiation of a second wavelength different than the first wavelength, the excited emission behavior of the luminophore being dependent on an oxygen partial pressure in a fluid contacting the luminophore, and a temperature-detection laminate emitting an infrared radiation, wherein the reaction laminate and the temperature-detection laminate are embodied separately from one another; the housing comprising:
   an opening through which a fluid is introducible into the housing;
   a reaction window through which the reaction laminate is reachable by the first electromagnetic radiation and which is penetrable by the second electromagnetic radiation; and
   a temperature-sensing window, arranged physically remotely from the reaction window, which is penetrable by the infrared radiation emitted from the temperature-detection laminate.

2. The reaction subassembly according to claim 1, wherein the reaction window is configured physically differently from the temperature-detection window.

3. The reaction subassembly according to claim 2, wherein the reaction window is thicker than the temperature-detection window.

4. The reaction subassembly according to claim 3, wherein the reaction window comprises a material that is transparent to light in the optically perceptible wavelength region; and the temperature-detection window encompasses a hole that passes through the housing and is covered by the temperature-detection laminate.

5. The reaction subassembly according to claim 1, wherein the housing comprises a further opening, different from the opening and located remotely therefrom, in such a way that the housing is flowthrough-capable for fluid between the opening and the further opening.

6. The reaction subassembly according to claim 5, wherein the layered component arrangement is provided between the opening and the further opening.

7. The reaction subassembly according to claim 5, wherein the subassembly is adapted for placement in a ventilation conduit arrangement of a ventilation apparatus; the reaction subassembly is adapted, in the region both of the opening and of the further opening, with a respective attachment configuration for connection to a respective portion of the ventilation conduit arrangement.

8. A sensor arrangement encompassing comprising a reaction subassembly according to claim 1 and further comprising a detector subassembly comprising:
   a radiation source that is adapted to emit the first electromagnetic radiation through the reaction window;
   a radiation detector that is adapted to detect the second electromagnetic radiation through the reaction window; and
   an infrared detector that is adapted to detect, through the temperature-detection window, the infrared radiation emitted from the temperature-detection laminate.

9. The sensor arrangement according to claim 8, wherein the detector subassembly is connectable or connected detachably to the reaction subassembly.

10. The sensor arrangement according to claim 8, wherein said sensor arrangement is signal-transferringly connected to an electronic evaluation apparatus that comprises at least a data memory and a data processing processor in data-exchanging communication with the data memory, calibration information for correlating detected infrared radiation of the temperature-detection laminate with the temperature of the luminophore being stored in the data memory.

11. A ventilation apparatus for artificial ventilation, having:
   a respiratory gas source;
   a ventilation conduit arrangement extending between the respiratory gas source and a patient-side proximal end;
   a valve arrangement encompassing an inhalation valve and an exhalation valve;
   a flowthrough sensor arrangement for quantitative detection of a gas flow in the ventilation conduit arrangement;
   a pressure modification arrangement for modifying the gas pressure of the gas flowing in the ventilation conduit arrangement; and having
   a control device that is configured at least to control the operation of the pressure modification arrangement on the basis of measurement signals of the proximal flowthrough sensor; and
   a sensor arrangement according to one of claim 8, for ascertaining an oxygen content of gas flowing in the ventilation conduit arrangement.

12. The reaction subassembly according to claim 7, wherein the subassembly is adapted as an oxygen measurement cuvette.

* * * * *